United States Patent
Stern et al.

(10) Patent No.: US 11,177,999 B2
(45) Date of Patent: *Nov. 16, 2021

(54) CORRELATING COMPUTING NETWORK EVENTS

(71) Applicant: International Business Machines Corporation, Armonk, NY (US)

(72) Inventors: Edith H. Stern, Yorktown Heights, NY (US); Kristian J. Stewart, Surrey (GB)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/661,106

(22) Filed: Oct. 23, 2019

(65) Prior Publication Data

US 2020/0059396 A1 Feb. 20, 2020

Related U.S. Application Data

(63) Continuation of application No. 15/226,636, filed on Aug. 2, 2016, now Pat. No. 10,491,453, which is a
(Continued)

(51) Int. Cl.
*G06F 15/173* (2006.01)
*H04L 12/24* (2006.01)
(Continued)

(52) U.S. Cl.
CPC ...... *H04L 41/0631* (2013.01); *H04L 29/0899* (2013.01); *H04L 41/065* (2013.01);
(Continued)

(58) Field of Classification Search
CPC . H04L 41/0631; H04L 41/0613; H04L 41/22; H04L 41/0668; H04L 41/0686;
(Continued)

(56) References Cited

U.S. PATENT DOCUMENTS 5,060,782 A 10/1991 Marti
6,336,139 B1 * 1/2002 Feridun ................... G06F 9/542
709/202
(Continued)

FOREIGN PATENT DOCUMENTS

JP 4679314 4/2011

OTHER PUBLICATIONS

Arnold et al., "Automatic Realization of SOA Deployment Patterns in Distributed Environments," ICSOC 2008, LNCS 5364, pp. 162-179, 2008.
(Continued)

*Primary Examiner* — Volvick Derose
(74) *Attorney, Agent, or Firm* — Michael O'Keefe

(57) ABSTRACT

A system and technique for correlating computing network events includes receiving a deployment request for a computing service and identify a deployment template corresponding to the requested computing service where the deployment template indicates resources needed for providing the computing service. Available resources are identified and targeted based on the deployment template. The targeted resources are deployed and the deployment template is associated in a memory with an identification of a resource set indicating each of the deployed resource elements. Responsive to receiving an event including a resource identifier, an event manager identifies the resource set having the deployed resource corresponding to the resource identifier and correlates the event with at least one other active event corresponding to the resource set.

20 Claims, 5 Drawing Sheets

Related U.S. Application Data continuation of application No. 13/775,205, filed on Feb. 24, 2013, now Pat. No. 9,438,645, which is a continuation of application No. 13/893,462, filed on Dec. 4, 2012, now Pat. No. 9,344,465.

(51) Int. Cl.
  *H04L 29/06* (2006.01)
  *H04L 29/08* (2006.01)
  *H04L 29/14* (2006.01)

(52) U.S. Cl.
  CPC ...... *H04L 41/0613* (2013.01); *H04L 41/0668* (2013.01); *H04L 41/0686* (2013.01); *H04L 41/0806* (2013.01); *H04L 41/0843* (2013.01); *H04L 41/22* (2013.01); *H04L 65/40* (2013.01); *H04L 67/36* (2013.01); *H04L 69/40* (2013.01); *H04L 29/06* (2013.01); *H04L 29/08072* (2013.01); *H04L 29/08144* (2013.01); *H04L 67/1002* (2013.01); *H04L 69/329* (2013.01)

(58) Field of Classification Search
  CPC ............. H04L 41/0806; H04L 41/0843; H04L 41/065; H04L 69/40; H04L 67/36; H04L 29/0899; H04L 65/40; H04L 69/329; H04L 67/1002; H04L 29/06; H04L 29/08072; H04L 29/08144
  USPC ........................................................ 713/104
  See application file for complete search history.

(56) References Cited

U.S. PATENT DOCUMENTS

| | | |
|---|---|---|
| 7,685,183 B2 | 3/2010 | Pace et al. |
| 7,774,657 B1 | 8/2010 | Hardman |
| 7,774,791 B1 | 8/2010 | Appelbaum et al. |
| 8,024,480 B2 | 9/2011 | DiStefano |
| 8,060,782 B2 | 11/2011 | Caspi et al. |
| 8,239,505 B2 | 8/2012 | Sedukhin et al. |
| 8,281,307 B2 | 10/2012 | Arnold et al. |
| 8,761,955 B2* | 6/2014 | Saigo ................... G06F 1/20 700/300 |
| 9,116,767 B1 | 8/2015 | Arif et al. |
| 9,317,311 B2 | 4/2016 | Anderson et al. |
| 9,344,465 B2 | 5/2016 | Stern |
| 9,438,645 B2 | 9/2016 | Stern |
| 9,612,890 B2 | 4/2017 | Chen et al. |
| 9,819,535 B2 | 11/2017 | Stern |
| 10,491,453 B2 | 11/2019 | Stern |
| 10,623,235 B2 | 4/2020 | Stern |
| 2002/0087734 A1* | 7/2002 | Marshall ................. G06F 9/50 719/310 |
| 2004/0205101 A1* | 10/2004 | Radhakrishnan ..... G06F 9/5083 709/200 |
| 2005/0091356 A1* | 4/2005 | Izzo ................... H04L 41/0609 709/223 |
| 2007/0112574 A1 | 5/2007 | Greene |
| 2007/0192769 A1* | 8/2007 | Mimura ............. H04L 67/1029 719/316 |
| 2008/0155346 A1 | 6/2008 | Britt et al. |
| 2008/0215673 A1 | 9/2008 | Behrendt et al. |
| 2008/0320326 A1 | 12/2008 | Akiyama et al. |
| 2008/0320343 A1* | 12/2008 | Eickmeyer .......... G06F 11/0781 714/57 |
| 2009/0070457 A1* | 3/2009 | McKinney .......... G06F 11/3495 709/224 |
| 2009/0106363 A1* | 4/2009 | Fallen ................. G06F 11/0778 709/204 |
| 2009/0113242 A1* | 4/2009 | Miller ................. G06F 11/0709 714/25 |
| 2009/0113327 A1 | 4/2009 | Pogrebinsky et al. |
| 2009/0171705 A1* | 7/2009 | Bobak ................. G06Q 50/188 705/80 |
| 2009/0172687 A1* | 7/2009 | Bobak .................... G06Q 10/06 718/104 |
| 2009/0265288 A1* | 10/2009 | Chakravarty .......... G06N 5/022 706/11 |
| 2009/0268715 A1* | 10/2009 | Jansson ................... H04L 65/40 370/352 |
| 2010/0023604 A1 | 1/2010 | Verma et al. |
| 2010/0070449 A1* | 3/2010 | Arnold ..................... G06N 5/02 706/48 |
| 2010/0070753 A1 | 3/2010 | Kido et al. |
| 2011/0022812 A1 | 1/2011 | van der Linden et al. |
| 2011/0125894 A1* | 5/2011 | Anderson ............... G06F 21/31 709/224 |
| 2011/0145657 A1 | 6/2011 | Bishop et al. |
| 2011/0214020 A1* | 9/2011 | Caspi .................. G06F 11/0709 714/37 |
| 2011/0289198 A1 | 11/2011 | Isaacson et al. |
| 2011/0302461 A1 | 12/2011 | Goertler et al. |
| 2012/0005166 A1 | 1/2012 | Pace et al. |
| 2012/0005205 A1 | 1/2012 | Bobick et al. |
| 2012/0066287 A1 | 3/2012 | Hajost |
| 2012/0084769 A1 | 4/2012 | Adi et al. |
| 2012/0096460 A1 | 4/2012 | Sekiguchi et al. |
| 2012/0131176 A1* | 5/2012 | Ferris .................... G06F 9/5072 709/224 |
| 2012/0151488 A1* | 6/2012 | Arcese ................ G06F 9/45504 718/101 |
| 2012/0197788 A1* | 8/2012 | Sanghvi ................. G06Q 30/02 705/40 |
| 2012/0303793 A1 | 11/2012 | Mestemaker et al. |
| 2013/0080902 A1* | 3/2013 | Jaisinghani ........... H04L 41/145 715/736 |
| 2013/0091252 A1* | 4/2013 | Pizzorni ................. H04L 69/329 709/219 |
| 2013/0262189 A1* | 10/2013 | Anderson ............. H04L 41/145 705/7.36 |
| 2013/0262643 A1* | 10/2013 | Anderson ................ G06F 8/60 709/223 |
| 2013/0262923 A1 | 10/2013 | Benson et al. |
| 2013/0326038 A1* | 12/2013 | Bodik .................... G06F 9/4856 709/223 |
| 2013/0332090 A1* | 12/2013 | Scolnicov .............. G06Q 50/06 702/50 |
| 2014/0172371 A1 | 6/2014 | Zhu et al. |
| 2015/0163288 A1 | 6/2015 | Maes et al. |
| 2015/0188789 A1 | 7/2015 | Jayaprakash |
| 2016/0147622 A1 | 5/2016 | Nichols et al. |

OTHER PUBLICATIONS

Hinton et al., "Security Patterns within a Service-Oriented Architecture," http://www.IBM.com/websphere/developer/services/, Nov. 2005.

Kloeckner, "Cloud Computing and Service Management Platform Services", IBM Corp., Oct. 25, 2010.

Eilam et al., "Managing the Configuration Complexity of Distributed Applications in Internet Data Centers," IEEE Communications Magazine, pp. 166-177, Mar. 2006.

* cited by examiner

CORRELATING COMPUTING NETWORK EVENTS

BACKGROUND

In data centers and other types of computing environments, fault management includes the processing of a considerable quantity of events daily. These events may indicate performance issues, infrastructure problems, application concerns etc. Often, a single problem will result in many events being generated, and even an event storm. For example, when a link goes down, the systems which the link connects may both generate events. Thus, when a resource on which many applications depend experiences issues, a veritable storm of events can occur. Event management systems correlate events to present a consolidated view of the events (e.g., collapsing multiple correlated events to a single line item), in order to enable an operator/administrator to address issues in an efficient manner.

BRIEF SUMMARY

According to one aspect of the present disclosure a system and technique for correlating computing network events is disclosed. The technique includes receiving a deployment request for a computing service and identify a deployment template corresponding to the requested computing service where the deployment template indicates resources needed for providing the computing service. Available resources are identified and targeted based on the deployment template. The targeted resources are deployed and the deployment template is associated in a memory with an identification of a resource set indicating each of the deployed resource elements. Responsive to receiving an event including a resource identifier, an event manager identifies the resource set having the deployed resource corresponding to the resource identifier and correlates the event with at least one other active event corresponding to the resource set.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
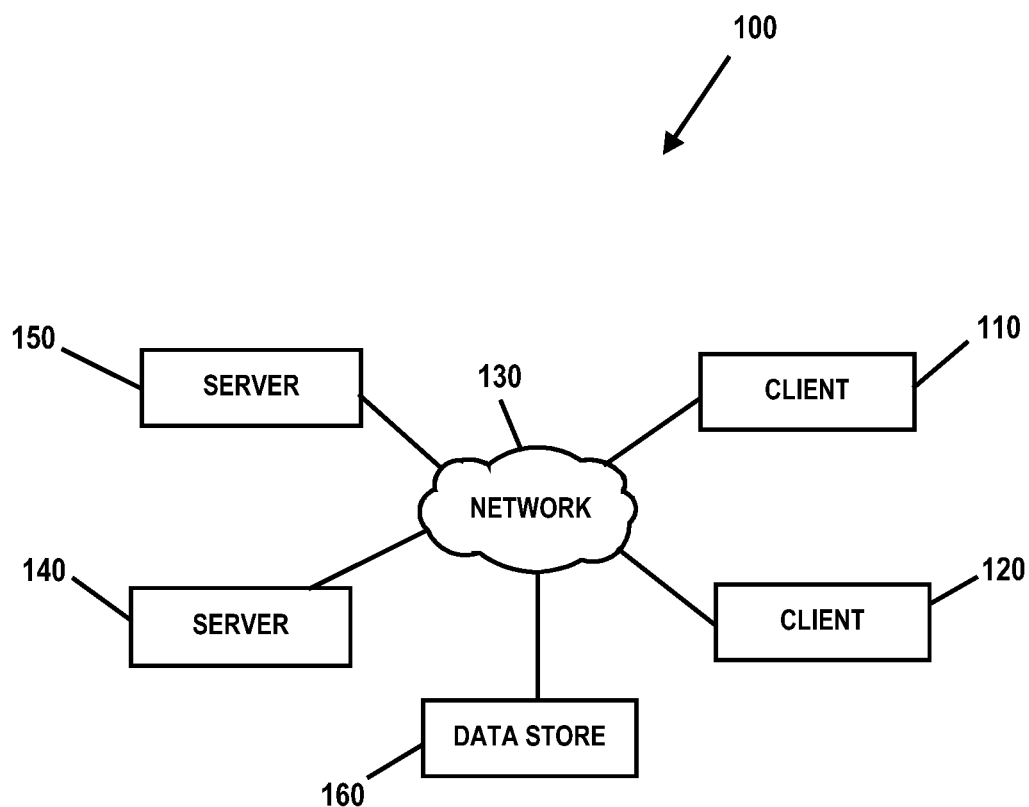
FIG. 1 is an embodiment of a network of data processing systems in which the illustrative embodiments of the present disclosure may be implemented.

Embodiments of the present disclosure provide a method and technique for correlating computing network events. For example, in some embodiments, the method and technique includes: receiving a plurality of events at an event manager residing on a host computing system; identifying a first resource associated with a first event; identifying a second resource associated with a second event; determining whether the first resource is associated with a deployment pattern; determining whether the second resource is associated with a deployment pattern; and responsive to determining that the first and second resources are each associated with a deployment pattern, correlating the first and second events responsive to the first and second resources being associated with a common deployment pattern. Embodiments of the present disclosure enable the correlation of computing network events based on a particular computing resource deployment pattern. For example, in some embodiments, deployed resources are associated with a particular deployed deployment pattern. Events received from deployed resources are evaluated to determine if the resource generating the event is associated with a particular deployed deployment pattern and, if so, events corresponding to a common deployed deployment pattern are correlated. Thus, events may be correlated over certain deployment pattern resources instead of an entire discovered resource topology. Further, embodiments of the present disclosure enable the correlation of computing network events based on a particular correlation pattern via a correlation identifier. For example, select resources of a deployed deployment pattern may be identified and included in a correlation pattern, and each respective resource of the correlation pattern is assigned a common correlation identifier that the resource incorporates into events generated by the resource. Events may then be correlated based on the correlation pattern using the correlation identifiers included in the received events.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
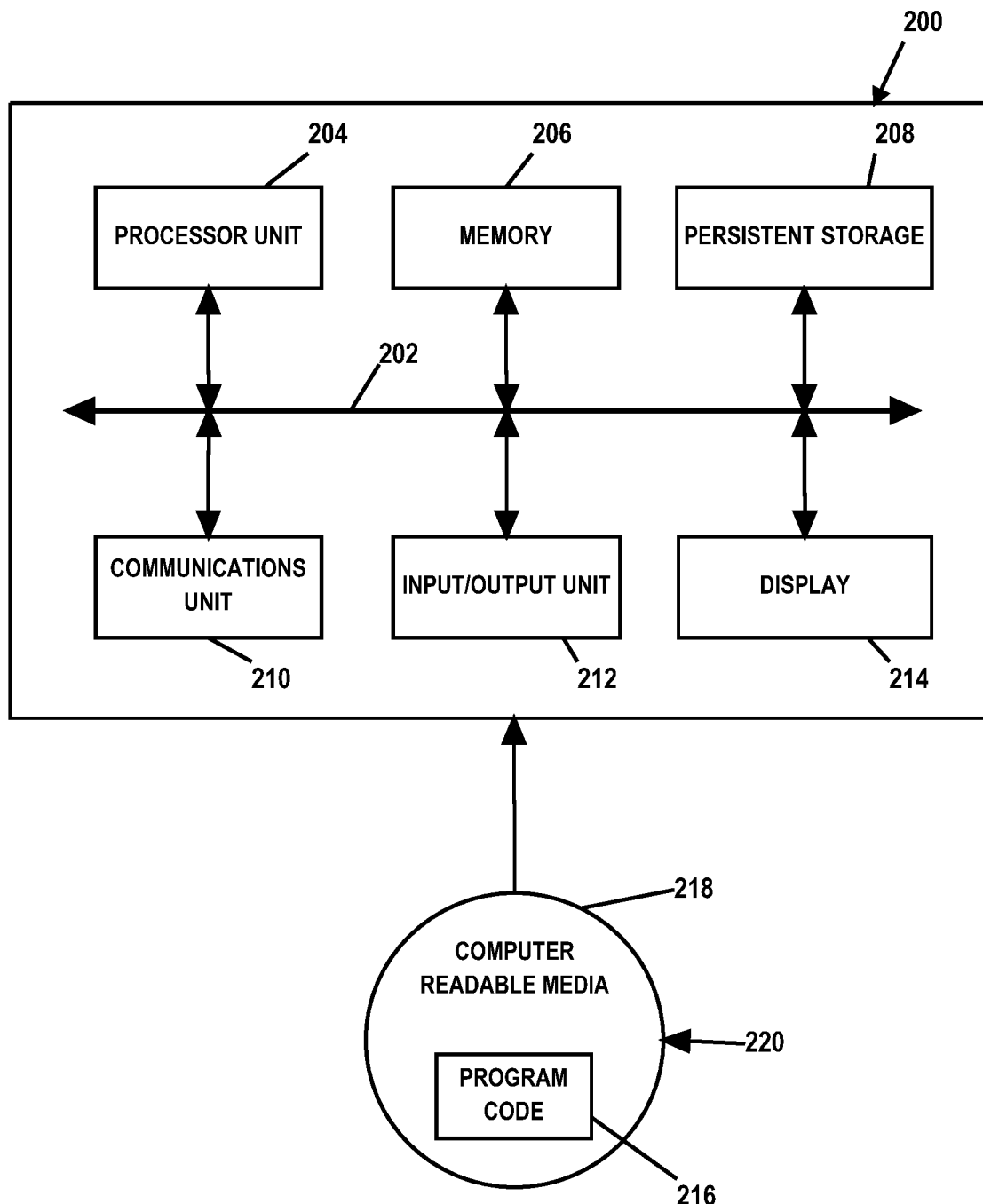
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for correlating computer network events according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
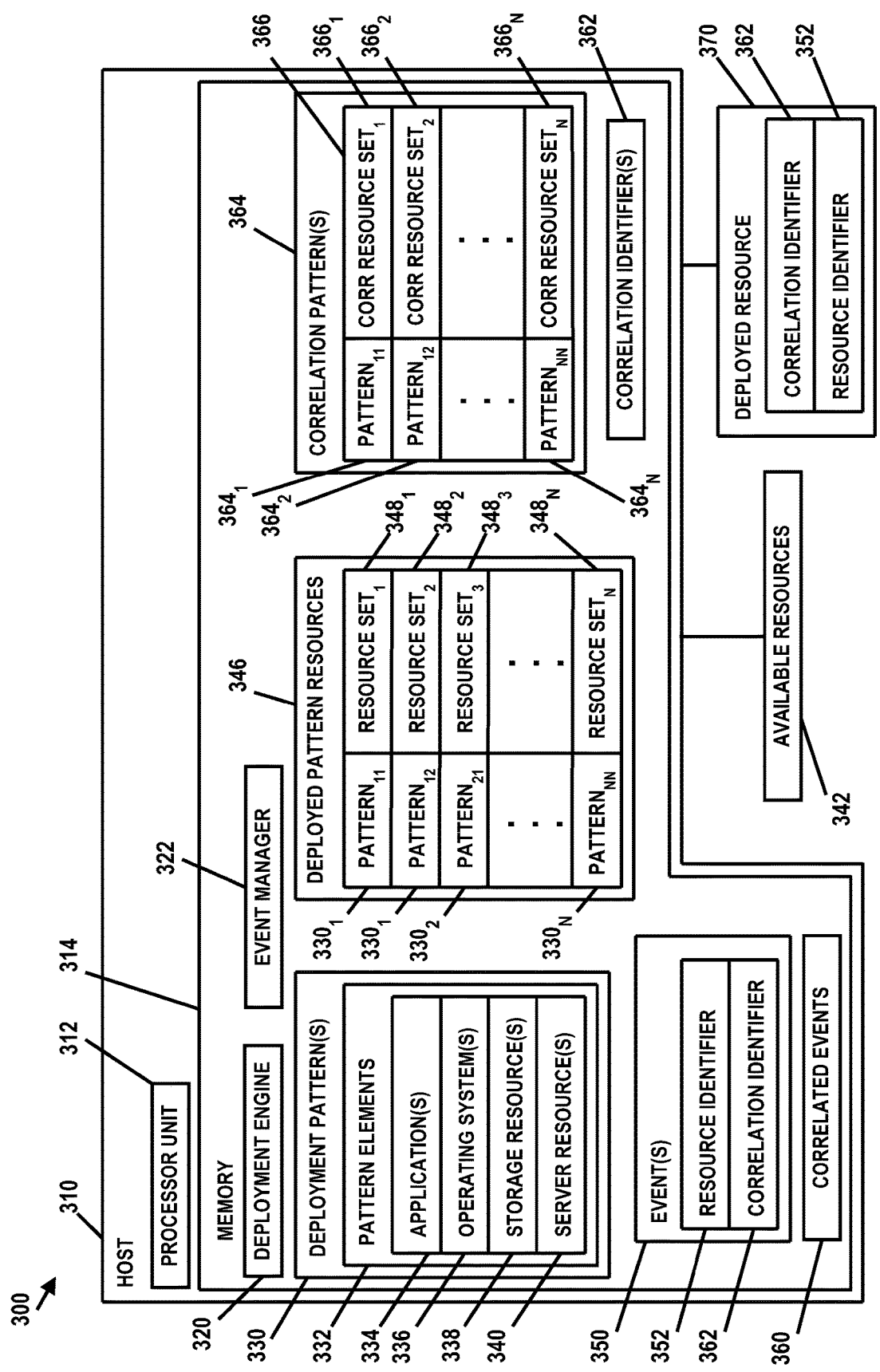
FIG. 3 is a diagram illustrating an embodiment of a data processing system for correlating computing network events in which illustrative embodiments of the present disclosure may be implemented.

FIG. 3 is an illustrative embodiment of a system 300 for correlating computing network events. System 300 may be implemented on data processing systems or platforms such as, but not limited to, servers 140 and/or 150, clients 110 and/or 120, or at other data processing system locations. In the embodiment illustrated in FIG. 3, system 300 comprises a host 310 (e.g., server 140) having one or more processor units 312 and a memory 314. In FIG. 3, memory 314 includes a deployment engine 320 and an event manager 322. Deployment engine 320 is configured to initiate, control and/or manage deployment of computing resources (e.g., in cloud environments, virtualized environments, or other types of computing environments). For example, deployment engine 320 may be configured to discover/ identify computing environment topologies, target various resources for deployment according to a deployment request (e.g., deployment of composite applications, web services, data marts, etc., for provisioning desired applications, operating systems, etc.), and deploy the targeted resources to provide the requested computing services. Event manager 322 is configured to receive and process events corresponding to the deployed resources. For example, events may be associated with performance issues, infrastructure problems, application concerns, etc. Deployment engine 320 and/or event manager 322 may be implemented in any suitable manner using known techniques that may be hardware-based, software-based, or some combination of both. For example, deployment engine 320 and/or event manager 322 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In FIG. 3, for ease of illustration and description, a single instance of deployment engine 320 is depicted; however, it should be understood that there may be multiple deployment engines for deploying computing resources (e.g., on a single server/host; distributed among multiple servers/hosts; one or more for deploying complex network configurations; one or more for deploying software; etc.). Further, in FIG. 3, deployment engine 320 and event manager 322 are depicted as residing on the same host 310 for ease of description and illustration; however, it should be understood that deployment engine 320 and event manager 322 may reside on different computing platforms.

Embodiments of the present disclosure correlate events to reduce the quantity of events an operator/administrator needs to address. In some embodiments, events are correlated based on a particular deployment pattern. In some embodiments, events are correlated based on a unique identifier seeded with elements/components of a deployed configuration.

In the embodiment illustrated in FIG. 3, system 300 includes one or more deployment patterns 330. Deployment patterns 330 generally comprise a particular pattern, template and/or collection of resources needed and/or provisioned for a particular computing need/service. For example, the pattern may be directed toward a web service, a data mart, or other type of computing service. Each deployment pattern 330 generally includes a number of deployment pattern elements 332 needed for providing the desired computing service. For example, such elements 332 may include, but not be limited to, one or more software applications 334, a specification of a particular type of operating system 336, storage resources 338, and server resources 340.

Deployment engine 320 accesses and/or otherwise identifies available resources 342 for deployment to a particular requested deployment pattern 330. For example, a request may be received in connection with a self-service facility interface and/or otherwise to initiate a computing resource deployment corresponding to a particular pattern 330. Deployment engine 320 may analyze and/or otherwise assess computing resource topologies and target certain resources for deployment according to the request (e.g., virtual machines, virtual switches, complex multi-tier applications, storage resources, servers, operating systems, etc.). Pattern 330 and the resources needing to be targeted may be determined by, for example, a request of deployment engine 320, receipt of communication from deployment engine 320, subscription to a message bus wherein a communication regarding deployment is passed, examination of a registry where the deployment pattern 330 has been recorded, etc. Deployment engine 320 thereafter deploys the targeted resources for providing the requested service. In FIG. 3, memory 314 includes deployed pattern resources 346 associating various deployed resources with a particular deployed deployment pattern 330. For example, in FIG. 3, there are illustrated two instances of a first deployed pattern $330_1$ (identified as $pattern_{11}$ and $pattern_{12}$), one instance of a second deployed pattern $330_2$ (identified as $pattern_{21}$), as well as other possible deployed patterns $330_n$ (through $pattern_{nn}$). For each deployed pattern 330, there is an associated identification of a deployed resource set 348. Each resource set 348 generally includes an identification of the particular resources that were provisioned for a particular deployed pattern 330. For example, in FIG. 3, $pattern_{11}$ for deployment pattern $330_1$ has associated therewith resource $set_1$ $348_1$, $pattern_{12}$ for deployment pattern $330_1$ has associated therewith resource $set_2$ $348_2$, $pattern_{21}$ for deployment pattern $330_2$ has associated therewith resource $set_3$ $348_3$, etc., through resource set $348_n$ for $pattern_{nn}$. Thus, a particular resource set 348 may identify particular deployed servers, application(s), storage resources, virtual machines, etc., for a particular instance of a deployment pattern 330. Deployed pattern resources 346 may be generated by deployment engine 320 in response to and/or in connection with the deployment of resources for a particular pattern 330.

In operation, after deployment, event manager 322 is configured to receive events 350 associated with the deployed resources. Events 350 may relate to network issues, application concerns, performance problems, etc. In some embodiments, an event 350 may include a resource identifier 352 having information uniquely identifying the resource that generated the particular event 350. However, it should be understood that a particular event 350 packet may be otherwise analyzed/evaluated to determine the source of the generated event 350. Event manager 322 evaluates the received events 350 and attempts to correlate events that are related in some aspect to reduce the quantity of events that may need to assessed/addressed. For example, in some embodiments, event manager 322 is configured to correlate events 350 based on deployment patterns 330. In this embodiment, event manager 322 determines whether the received events 350 are associated with one or more elements of a deployed pattern 330. For example, in some embodiments, event manager 322 will identify and/or otherwise associate the received events 350 with a resource, and then associate the resource with one or more elements of a deployed pattern 330. If the events are associated with a common deployment pattern 330, event manager 322 associates the events together (i.e., the events are correlated). In some embodiments, event manager 322 identifies and/or otherwise determines a resource associated with a received event 350 and evaluates/searches resource sets 348 for the identified resource. Events 350 associated with resources common to a particular resource set 348 (which is associated with a particular pattern 330) are correlated. Thus, for example, if multiple events 350 are received from resources associated with resource $set_2$ $348_2$, the events 350 are correlated as to the deployed $pattern_{12}$ and linked together.

In some embodiments, a deployment pattern 330 may be a subset of a discovered topology. For example, deployment engine 320 may discover a number of elements comprising a computing infrastructure/environment. The discovered elements may have been deployed at different times, and be of different resource types (e.g., network, server, storage, etc.). By using the deployment pattern 330 rather than the discovered topology to perform the correlation, correlation of events associated with the elements that are intentionally deployed together is achieved. For example, in a banking system, a service may include a customer database, applications, middleware, a network and storage. A new application deployed may include several new virtual machines and reuse an existing customer database, elements of the network, etc. Correlation of events over the newly deployed application elements instead of the full service provides more actionable insights to the operator/administrator evaluating such events, thereby reducing the number of events that must be handled and presenting targeted information to the newly deployed application.

The events 350 that are correlated (indicated as correlated events 360 in FIG. 3) may be indicated to an operator/administrator in a number of ways. For example, in some embodiments, an indication of the correlated events 360 may be performed by color coded event indicators on a list, displaying a single indicator rather than multiple indicators (e.g., condensing multiple events into a single or lesser quantity of events), displaying a message, displaying a new/different event, displaying a graphic indication, etc. This correlation indication may be visual, a synthetic event, a notification to a mobile device, etc. In some embodiments, the association/correlation additionally includes an indication of at least one of the deployment pattern 330, current topology, containment models, etc.

In some embodiments, certain deployed resources are seeded with a correlation identifier 362 that is used by event manager 322 to correlate received events 350. For example, in some embodiments, one or more correlation patterns 364 are created. A correlation pattern 364 may comprise a select set of the resources to be deployed for a particular deployment pattern 330 (e.g., a subset of the resources to be deployed for a particular deployment pattern 330). Correlation patterns 364 may be determined/created based on application of a business policy (e.g., all resources deployed by a particular person, department, or customer), on correlation hints obtained from the application or service developer as part of the development package or as part of a communication received regarding deployment, examination of a registry where the deployment pattern 330 has been recorded, determined by implication from the deployment pattern 330 (e.g., all the elements of the deployment pattern 330 may belong to one correlation group), etc. It should be understood that that multiple correlation patterns 364 are possible for a given element of a deployment. The set of resources which are intended to form a particular correlation pattern 364 may be determined at the time of resource deployment, at the time of pattern 330 creation by the pattern creator, as part of the application by the application developer, inserted by request of another interested party, or otherwise.

In FIG. 3, a correlation resource set$_1$ 366$_1$ is defined for a correlation pattern 364$_1$ associated with pattern$_{11}$, a correlation resource set$_2$ 366$_2$ is defined for a correlation pattern 364$_2$ associated with pattern$_{12}$, through a correlation pattern 364$_n$ associated with correlation resource set 366$_n$ for pattern$_{nn}$. Each correlation resource set 366 identifies and/or otherwise indicates a particular subset of resources deployed for a particular deployment pattern 330 (e.g., pattern$_{11}$). A correlation identifier 362 is assigned to and/or otherwise associated with a particular correlation pattern 364, and deployment engine 320 seeds the resources comprising the respective correlation resource set 366 that are to be deployed with the assigned correlation identifier 362. That is, the components/elements for which it is useful to correlate events are seeded with a common identifier (correlation identifier 362). The resources identified for a particular correlation pattern 364 may comprise a subset or portion of a deployment pattern 330, a full deployment pattern 330, or multiple deployment patterns 330. The resources may include virtual machines, virtual switches, complex multi-tier applications, etc. For example, a business may want all applications deployed on behalf of a particular department to result in events that are correlated. A complex new application laid on top of existing infrastructure may be of particular interest, and the operations personnel may desire a quick way to correlate events from all the newly deployed elements. The developers of a complex application may want to have correlations for each of the main subsystems in order to better address performance and other issues.

Correlation identifier 362 may be developed/created or received from an external system, and serves as a common identifier for elements of the correlation pattern 364 (i.e., a globally unique identifier). In some embodiments, the correlation identifier 362 may be formed by appending the deployment system (e.g., system 300) identifier to another id, thereby enabling implementation of the present method in environments with multiple deployment systems.

Thus, the correlation identifier 362 is provided to the elements being deployed (e.g., a deployed resource 370 depicted in FIG. 3). In some embodiments, the correlation identifier 362 is inserted at the time of resource deployment. The deployed resource 370 is configured such that events 350 generated by the deployed resource 370 are created and formatted to include the correlation identifier 362. In some embodiments, deployment engine 320 (or another resource) is used to configure an element at the time of deployment to include the correlation identifier 362 as part of the payload of each event it emits via any appropriate configuration interface. Where the deployed resource does not support such an interface, the correlation identifier 362 may be provided via an agent distributed with or as part of a resource, a file sent to the resource upon successful deployment, part of the deployment package, etc.

When a deployed resource experiences an event, an alert is formatted to be sent to event manager 322. The event 350 may be created by the resource (e.g., as a simple network management protocol (SNMP) trap), by an agent or a probe (e.g., by a monitoring agent or probe), or otherwise. The generated event 350 will incorporate the correlation identifier 362. Events 350 collected by event manager 322 are then correlated using the correlation identifier 362. When an event 350 is received, event manager 322 determines whether it can be correlated with another active event 350.

The correlation identifier 362 is used to search other active events 350 for a match. In some embodiments, the correlation identifier 362 is used as an index into the active events 350 set. An indication is provided to the operator/administrator of the events 350 that are correlated (e.g., color coding indicators on a list, displaying a single indicator rather than multiple indicators, displaying a message, displaying a different/other event, displaying a graphic, etc.). The correlation indication may be visual, a synthetic event, a notification to a mobile device, etc. In some embodiments, the indication may include enrichment based on the correlation identifier 362 (e.g., a customer name).

Thus, an advantage of the present disclosure is that as elements/resources of the service are relocated, the correlation identifier 362 remains intact and can be used as part of the correlation methodology for event management. Further, multiple correlation patterns 364 may be included for a single complex application. For example, in a shared environment, a correlation pattern 364 may be used to indicate the "owner" of several applications, to identify sub-elements which participate in common failure patterns (e.g., the input request handler and the queuing mechanism), etc.

Figure 4:
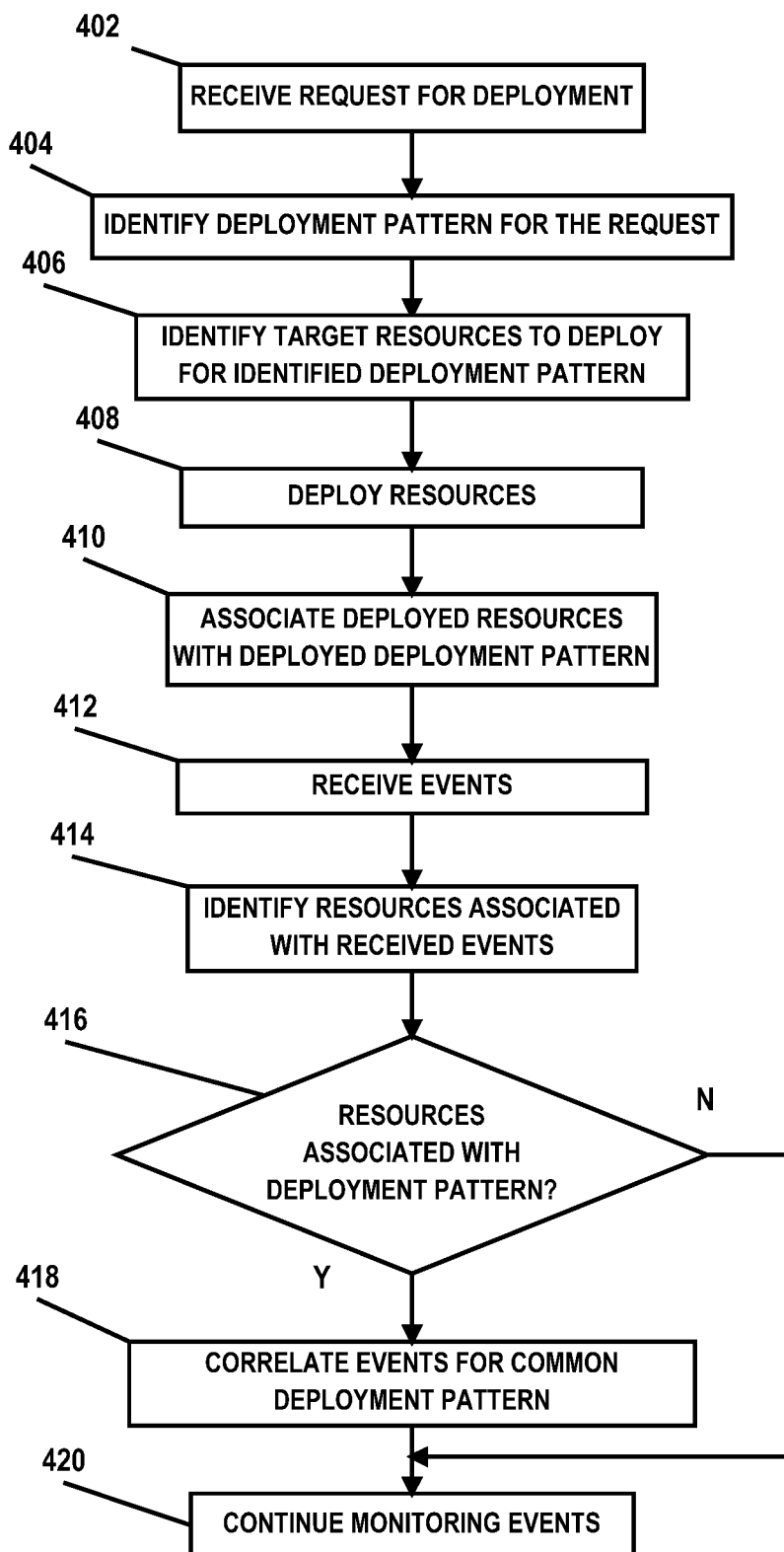
FIG. 4 is a flow diagram illustrating an embodiment of a method for correlating computing network events according to the present disclosure.

FIG. 4 is a flow diagram illustrating an embodiment of a method for correlating computing network events. The method begins at block 402, where a request for a computing resource deployment is received. At block 404, a deployment pattern 330 is identified for the requested service. At block 406, target resources are identified for the service request based on the identified deployment pattern 330. At block 408, resources are deployed based on the deployment pattern 330 for the request.

At block 410, the deployed resources are associated with the deployed deployment pattern. At block 412, event are generated by one or more of the deployed resources and received by event manager 322. At block 414, event manager 322 identifies the resources associated with the received events. At decisional block 416, a determination is made whether the identified resources are associated with a particular deployed deployment pattern. If so, the method proceeds to block 418, where events corresponding to a common deployment pattern 330 are correlated. At block 420, event manager 322 continues monitoring/evaluating received events. At decisional block 416, if a determination is made that the identified resources are not associated with a deployed deployment pattern or there is no common deployment pattern for the identified resources, the method proceeds from decisional block 416 to block 420.

Figure 5:
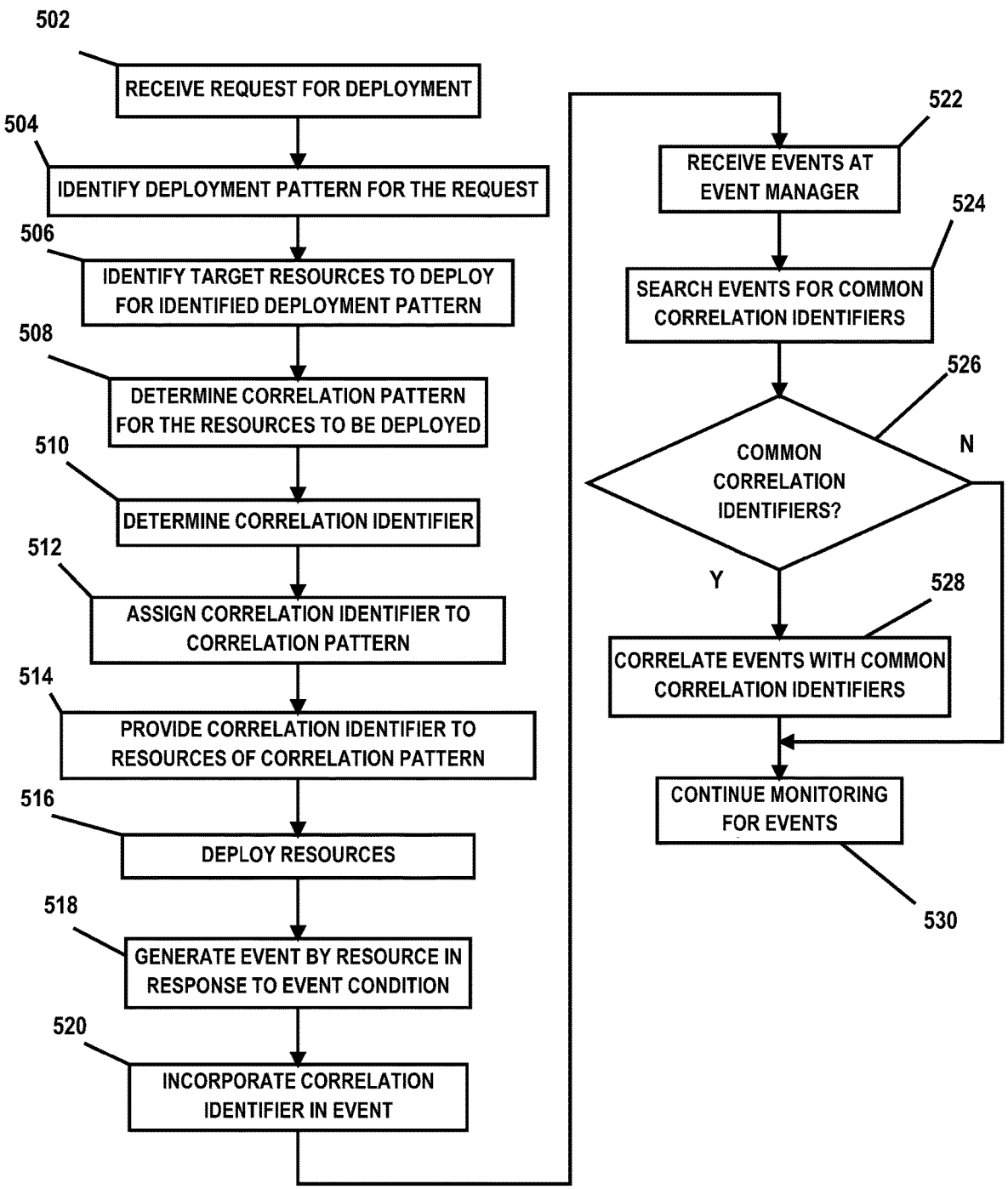
FIG. 5 is a flow diagram illustrating another embodiment of a method for correlating computing network events according to the present disclosure.

FIG. 5 is a flow diagram illustrating another embodiment of a method for correlating computing network events. The method begins at block 502, where a request for a computing resource deployment is received. At block 504, a deployment pattern 330 is identified for the service request. At block 506, target resources for the identified deployment pattern are identified. At block 508, a correlation pattern 364 is identified for the resources to be deployed. At block 510, a correlation identifier 362 is determined. At block 512, the correlation identifier 362 is assigned to the correlation pattern 364.

At block 514, the correlation identifier 362 is provided to the resources of the correlation pattern 364. At block 516, the resources are deployed for the service request. At block 518, in response to an event condition, one or more deployed resources generate respective events. At block 520, the respective resources generating the events that are part of a correlation pattern 364 and/or otherwise have a correlation identifier 362 incorporate the correlation identifier 362 in the event. At block 522, the respective resources communicate the events to event manager 322.

At block 524, event manager 322 searches received events for common correlation identifiers 362. At decisional block 526, a determination is made whether any events have common correlation identifiers 362. If so, the method proceeds to block 528, where event manager 322 correlates the events having common correlation identifiers 362. If no events are found at decisional block 526 having common correlation identifiers 362, the method proceeds from decisional block 526 to block 530. At block 530, event manager 322 continues monitoring for and/or evaluating received events.

Thus, embodiments of the present disclosure enable the correlation of computing network events based on a particular computing resource deployment pattern. For example, in some embodiments, deployed resources are associated with a particular deployed deployment pattern. Events received from deployed resources are evaluated to determine if the resource generating the event is associated with a particular deployed deployment pattern and, if so, events corresponding to a common deployed deployment pattern are correlated. Thus, events may be correlated over certain deployment pattern resources instead of an entire discovered resource topology. Further, embodiments of the present disclosure enable the correlation of computing network events based on a particular correlation pattern via a correlation identifier. For example, select resources of a deployed deployment pattern may be identified and included in a correlation pattern, and each respective resource of the correlation pattern is assigned a common correlation identifier that the resource incorporates into events generated by the resource. Events may then be correlated based on the correlation pattern using the correlation identifiers included in the received events.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
   a processor;
   a deployment engine executable by the processor to:
      receive a deployment request for a computing service;
      identify a deployment template corresponding to the requested computing service, the deployment template indicating resources needed for providing the computing service;
      identify available resources based on the deployment template;
      target available resource elements for deployment;
      deploy the targeted resource elements in a computing environment; and
   associate with the deployment template in a memory an identification of a resource set indicating each of the deployed resource elements; and
   an event manager executable by the processor to, responsive to receiving an event including a resource identifier, identify the resource set having the deployed resource corresponding to the resource identifier and correlate the event with at least one other active event corresponding to the resource set.

2. The system of claim 1, wherein the event manager is further configured to provide an indication of the correlated events.

3. The system of claim 2, wherein the event manager is further configured to condense a plurality of indications of correlated events to a single indication.

4. The system of claim 1, wherein the deployment engine is further configured to associate the resource set with a deployed application.

5. The system of claim 1, wherein the event manager is further configured to create a synthetic event representing correlated events.

6. The system of claim 1, wherein the event manager is further configured to create color coded indications corresponding to correlated events.

7. A computer program product for correlating computing network events, the computer program product comprising:
   a non-transitory computer readable medium having computer readable program code embodied therewith, the computer readable program code comprising computer readable program code configured to:
      receive a deployment request for a computing service;
      identify a deployment template corresponding to the requested computing service, the deployment tem plate indicating resources needed for providing the computing service;

identify available resources based on the deployment template;

target available resource elements for deployment;

deploy the targeted resource elements in a computing environment;

associate with the deployment template in a memory an identification of a resource set indicating each of the deployed resource elements; and responsive to receiving an event including a resource identifier, identify the resource set having the deployed resource corresponding to the resource identifier and correlate the event with at least one other active event corresponding to the resource set.

8. The computer program product of claim 7, wherein the computer readable program code is configured to provide an indication of the correlated events.

9. The computer program product of claim 8, wherein the computer readable program code is configured to condense a plurality of indications of correlated events to a single indication.

10. The computer program product of claim 7, wherein the computer readable program code is configured to associate the resource set with a deployed application.

11. The computer program product of claim 7, wherein the computer readable program code is configured to create a synthetic event representing correlated events.

12. The computer program product of claim 7, wherein the computer readable program code is configured to create color coded indications corresponding to correlated events.

13. A method, comprising:
identifying computing resources to be deployed;
receiving an identification of a correlation pattern comprising a set of the resources to be deployed;
assigning a correlation identifier to the correlation pattern;
deploying the resources in a computing environment;
distributing an agent with the deployed resources, the agent configured to provide the correlation identifier to a respective deployed resource to enable the respective deployed resource to include the correlation identifier with a fault event packet generated by the respective resource, wherein a quantity of fault events to assess is reduced based on the correlation identifier.

14. The method of claim 13, further comprising:
receiving a plurality of events from the deployed resources;
identifying a correlation identifier associated with each of the plurality of received events; and
correlating the events having a common correlation identifier.

15. The method of claim 14, further comprising providing an indication of the correlated events.

16. The method of claim 14, further comprising providing a visual indication of the correlated events.

17. The method of claim 14, further comprising condensing a plurality of indications of correlated events to a single indication.

18. The method of claim 13, further comprising associating the correlation pattern with a deployed application.

19. The method of claim 13, further comprising creating a synthetic event representing correlated events.

20. The method of claim 13, further comprising creating color coded indications corresponding to correlated events.

* * * * *